Patented Apr. 2, 1935

1,996,197

UNITED STATES PATENT OFFICE 1,996,197

METHOD OF PRODUCING PURIFIED VISCOSE SOLUTIONS

Ernst Freund, Vienna, Austria

No Drawing. Application July 31, 1934, Serial No. 737,859. In Austria November 21, 1932

9 Claims. (Cl. 260—100)

This invention relates to the production of purified viscose solutions. The sulphur compounds present in the usual viscose solutions yield, on precipitation of the viscose in acid baths, hydrogen sulphide which gives rise to very considerable difficulties and disturbances in connection with the manufacturing of artificial structures from regenerated cellulose. A number of methods have consequently been proposed for the elimination of the alkali sulphide compounds from the viscose. These methods can be roughly divided into two groups, namely (a) into methods by which the cellulose xanthogenate is coagulated from the viscose solution, to be subsequently washed in the coagulated state, and (b) into methods by which the alkali sulphide compounds are washed out of the immature cellulose xanthogenate, before the dissolving of the latter, by means of aqueous mixtures such as for example salt solutions and the like.

The methods included in group (a) have not become widely adopted in practice, since the washing out of the highly aqueous coagulates is attended with very considerable difficulties, while at the same time the fact that the cellulose xanthogenates are dissolved twice has a disadvantageous effect upon the strength of the finished product. Methods of this nature are described, for example, in the German Patent No. 209,161, U. S. Patent No. 1,562,885, and French Patent No. 340,563.

The cellulose xanthogenates purified by the methods of group (b) contain, after washing with concentrated salt solutions, large quantities of salt which give rise to serious disturbances in the course of the further treatment. Moreover, these methods fail to take account of the fact that cellulose xanthogenates shortly after their evolution contain only traces of alkali sulphides, since the bulk of the latter only becomes formed during the ripening process. Methods pertaining to this group are described, for example, in the Austrian Patent No. 116,362, which discloses the use of dilute solutions of sulfites, sodium sulfide, caustic soda and the like for washing sulfur impurities from cellulose xanthogenate.

The present invention provides a method in which the above-mentioned drawbacks are obviated, and which permits of the production of viscose solutions containing but traces of sulphur.

The new method consists essentially in causing cellulose xanthogenate to ripen before becoming dissolved. During the maturing period the bulk of the alkali sulphide becomes formed, and this can then be eliminated by washing out with suitable solutions. If salt solutions are employed for the washing out, the concentration thereof can be kept down to a low value, on account of the diminished solubility of the cellulose xanthogenates after ripening, with the result that the residue of salt left in the cellulose xanthogenate is very slight, in contradistinction to the methods of the above-mentioned group (b).

The undissolved cellulose xanthogenate can not be caused to ripen by merely being left to stand, since it absorbs atmospheric oxygen with avidity. The protection of the cellulose xanthogenate from the oxygen of the atmosphere, for instance by storage in hydrocarbons, in inert gases, or in vacuo, is likewise inadequate for the purpose of obtaining perfect products, since the cellulose xanthogenate contains large quantities of alkali which exert a decomposing effect upon the cellulose when allowed to act thereon for any considerable length of time.

I have found that the undissolved cellulose xanthogenate can be caused to ripen very satisfactorily by covering the same with liquids which exert a solvent action on the alkalies and alkali sulphides contained in the cellulose xanthogenate but which do not dissolve the cellulose xanthogenate itself. Salt solutions, mixtures of alcohols and water, and other liquid mixtures may be given as examples of such liquids.

With the employment of salt solutions for example, the cellulose xanthogenate may be covered with a 33% sodium chloride solution, left to stand for 8-100 hours, then pressed out, and washed with a dilute salt solution.

The concentration of the salt solution used for washing can be determined by a preliminary test. This concentration must be such that the ripened cellulose xanthogenate does not appreciably swell and permits of being satisfactorily pressed out.

The aqueous mixtures or mixtures of liquids used for ripening and washing may be of neutral, basic, or acid reaction, but must not be of a nature to decompose the cellulose xanthogenate.

It is advantageous to maintain a low temperature during the process of ripening.

It is often of advantage to carry out the method with cellulose xanthogenates containing as little alkali as possible, since in the course of the maturing process the liquid mixtures deprive the cellulose xanthogenate of a large proportion of the free alkali present. The cellulose xanthogenates thus treated are then dissolved in the usual manner to yield viscose solutions.

The viscose solutions produced by the above-described method are particularly well suited for the manufacturing of artificial filaments, membranes, films, and the like, and can also be used to advantage as dressing and finishing agents, adhesives, and the like.

It has further proved to be advantageous to add substances such as peroxides and per salts after the dissolving of the cellulose xanthogenate in the present method.

The addition of peroxides to viscose is known per se. The British Patent No. 228,348, describes the employment of peroxides or per salts for example, hydrogen peroxide, alkali peroxides, per sulfates and similar per salts, as an addition to viscose. However in order to oxidize all the alkali sulphides normally contained in the viscose such large quantities of peroxides or per salts are required that the method is too expensive, and that, in addition, incidental reactions, such as oxidation of the xanthogenate or the formation of oxycellulose, can not be prevented. Tests have shown that peroxides or per salts, when used in a concentration of less than 0.3% and preferably under 0.1% calculated on hydrogen peroxide, are incapable of setting up any deleterious incidental reactions. However, such a slight addition would be futile for the purpose of the British Patent No. 228,348, since only a very small proportion of the alkali sulphides contained in the non-purified viscose could become oxidized, and the generation of gas, which interferes with the spinning process, could therefore not be avoided either.

The above-mentioned further step consists, in contradistinction to any other known method, in the addition to the viscose solutions poor in alkali sulphide produced in the above-described manner, peroxides and/or per salts in such slight concentration that undesired incidental reactions do not occur.

The following are examples of the carrying out of the method according to the present invention the scope of which is not to be considered as in any way limited to or by the particulars given in these examples.

(1) 100 parts of cellulose are steeped for three to twenty-four hours in a caustic soda solution of 18% strength at a temperature of 15–18° C., then if desired or necessary left to ripen for 6 to 72 hours, after which the alkaline cellulose is pressed out until reduced to 240 to 300 parts. The expressed cellulose is then sulphuretted with 30–50 parts of carbon disulphide, the resulting cellulose xanthogenate if necessary ground, and the surplus carbon disulphide drawn off. The cellulose xanthogenate is then caused to ripen under 1000–2000 parts of a 33% sodium chloride solution for 36 hours at a temperature of 16° C., then pressed out until reduced to 260–300 parts, and finally washed with a 5% sodium chloride solution. The washed material is once more thoroughly pressed out, and then dissolved, with agitation, in 1400 parts of a 5% caustic soda solution. The viscose thus obtained is of a pale yellow color which does not alter when the viscose is left to stand for a long time, and admits of precipitation in acid baths, even without the addition of salt, to yield structures of regenerated cellulose. These structures possess excellent properties.

(2) 250 parts by weight of cellulose xanthogenate produced in accordance with Example (1) are dissolved in 1400 parts of caustic soda solution containing 0.1% $H_2O_2$, and then worked up in the usual manner to yield artificial structures of regenerated cellulose. If acid precipitating baths be employed, the addition of salt is not required.

I claim:

1. The method of producing purified viscose solutions which comprises ripening cellulose xanthogenate while submersed in a liquid which will not dissolve the cellulose xanthogenate but which will dissolve the sulfur impurities formed during the said ripening and then dissolving the said xanthogenate in a conventional manner.

2. The method of producing purified viscose solutions which comprises ripening cellulose xanthogenate while submersed in a liquid which will not dissolve the cellulose xanthogenate but which will dissolve the sulfur impurities formed during the said ripening, washing out the ripened xanthogenate with a dilute aqueous solution of said liquid and dissolving the said xanthogenate in a conventional manner.

3. In a method as claimed in claim 1 the further step of adding a peroxide to the purified cellulose xanthogenate to oxidize any impurities consisting of sulfur compounds still present therein.

4. In a method as claimed in claim 1 the further step of adding a per salt to the purified cellulose xanthogenate, to oxidize any impurities consisting of sulfur compounds still present therein.

5. In the method of producing purified viscose solutions as defined by claim 1, the further step of adding a substance taken from the group consisting of peroxides and per-salts to the purified cellulose xanthogenate.

6. The method of producing purified viscose solutions which comprises ripening cellulose xanthogenate while submersed in a liquid which does not dissolve the cellulose xanthogenate, but which will dissolve the sulfur impurities formed during the said ripening, dissolving the cellulose xanthogenate, and oxidizing sulfur impurities remaining in the dissolved cellulose xanthogenate.

7. The method of producing purified viscose solutions as defined by claim 6 in which the sulfur impurities present are oxidized by the addition of an oxidizing agent to the cellulose xanthogenate.

8. In the method of producing purified cellulose xanthogenate as defined by claim 1 the further step of adding hydrogen peroxide to the dissolved xanthogenate.

9. In the method of producing purified cellulose xanthogenate as defined by claim 1 the further step of adding an alkali peroxide to the dissolved xanthogenate.

ERNST FREUND.